United States Patent
Long et al.

(10) Patent No.: US 11,004,200 B2
(45) Date of Patent: May 11, 2021

(54) METHOD AND DEVICE FOR PERFUSION ANALYSIS

(71) Applicant: SHANGHAI UNITED IMAGING HEALTHCARE CO., LTD., Shanghai (CN)

(72) Inventors: Fan Long, Shanghai (CN); Jieyan Ma, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 199 days.

(21) Appl. No.: 16/116,817

(22) Filed: Aug. 29, 2018

(65) Prior Publication Data
US 2019/0057506 A1    Feb. 21, 2019

Related U.S. Application Data

(63) Continuation of application No. PCT/CN2017/074703, filed on Feb. 24, 2017.

(30) Foreign Application Priority Data

Feb. 29, 2016 (CN) .......................... 201610112593.X

(51) Int. Cl.
    *G06T 7/00*      (2017.01)
(52) U.S. Cl.
    CPC .. *G06T 7/0016* (2013.01); *G06T 2207/10076* (2013.01); *G06T 2207/10088* (2013.01);
(Continued)

(58) Field of Classification Search
None
See application file for complete search history.

(56) References Cited

U.S. PATENT DOCUMENTS

| 2002/0177957 | A1* | 11/2002 | Lee | A61B 6/504 702/19 |
| 2004/0218794 | A1* | 11/2004 | Kao | G06T 7/11 382/128 |

(Continued)

FOREIGN PATENT DOCUMENTS

| CN | 1689510 A | 11/2005 |
| CN | 101718848 A * | 6/2010 |

(Continued)

OTHER PUBLICATIONS

Parameter Estimation in a Model Based Approach for Tomographic Perfusion Measurement. Neukirchen et al. (Year: 2005).*

(Continued)

*Primary Examiner* — Delomia L Gilliard
(74) *Attorney, Agent, or Firm* — Metis IP LLC

(57) ABSTRACT

The present disclosure may provide a method for perfusion analysis. The method may include: obtaining a plurality of scan images corresponding to a plurality of time points; obtaining a plurality of time-density discrete points based on the plurality of scan images; determining an initial time-density curve based on the plurality of time-density discrete points, the initial time-density curve indicating a density variation of a contrast agent in an organ or tissue over time, the organ or tissue corresponding to a pixel or voxel in the plurality of scan images; obtaining a first perfusion model; determining a first perfusion parameter based on the first perfusion model and the initial time-density curve; obtaining a second perfusion model; and determining a second perfusion parameter based on the second perfusion model and the first perfusion parameter.

20 Claims, 9 Drawing Sheets

(52) U.S. Cl.
CPC ............. *G06T 2207/10104* (2013.01); *G06T 2207/30104* (2013.01)

(56) References Cited

U.S. PATENT DOCUMENTS

| | | | |
|---|---|---|---|
| 2005/0187462 A1* | 8/2005 | Koh ..................... | A61B 6/481 600/416 |
| 2007/0167731 A1* | 7/2007 | Taxt ................... | G01R 33/5601 600/410 |
| 2008/0049994 A1* | 2/2008 | Rognin .................... | G06T 7/35 382/128 |
| 2009/0297008 A1* | 12/2009 | Taxt ..................... | G06T 7/0012 382/131 |
| 2011/0118615 A1* | 5/2011 | Yang ..................... | A61B 6/507 600/504 |
| 2011/0257519 A1* | 10/2011 | Bj?rnerud ............. | A61B 5/055 600/431 |
| 2011/0293074 A1* | 12/2011 | Coolens ................. | A61B 6/486 378/207 |
| 2012/0121145 A1* | 5/2012 | Funabasama ........ | A61B 6/5217 382/128 |
| 2013/0266201 A1 | 10/2013 | Pautot | |
| 2014/0219532 A1 | 8/2014 | Pautot | |
| 2015/0182118 A1* | 7/2015 | Bradbury ............. | A61B 1/0005 600/431 |
| 2015/0230771 A1* | 8/2015 | Lee ...................... | G06T 7/0016 382/131 |
| 2016/0073992 A1 | 3/2016 | Liu | |
| 2016/0140712 A1* | 5/2016 | Ohyu ................... | A61B 6/507 382/131 |
| 2016/0166159 A1* | 6/2016 | Yang .................... | A61B 6/481 600/419 |
| 2016/0228085 A1* | 8/2016 | Mouridsen ............ | A61B 6/501 |
| 2016/0231410 A1* | 8/2016 | Warfield ................ | A61B 5/055 |
| 2019/0015061 A1* | 1/2019 | Liebeskind ............ | A61B 6/461 |

FOREIGN PATENT DOCUMENTS

| | | | |
|---|---|---|---|
| CN | 101718848 A | 6/2010 | |
| CN | 101756713 A | 6/2010 | |
| CN | 103839249 A | 6/2014 | |
| CN | 105809670 A | 7/2016 | |
| EP | 1833373 A2 * | 9/2007 | ............ A61B 8/481 |

OTHER PUBLICATIONS

International Search Report in PCT/CN2017/074703 dated Apr. 7, 2017, 6 pages.
First Office Action in Chinese Application No. 201610112593.X dated Jan. 19, 2018, 23 pages.
Zhaohui Li, The empirical research and prediction of CPI bnased on the wavelet analysis. 2011.
S P Sourbron et al., Tracer Kinetic Modelling in MRI: Estimating Perfusion and Capillary Permeability, Physics in Medicine and Biology, 57(2), 33 Pages, 2012.
Keith S. St. Lawrence et al., An Adiabatic Approximation to the Tissue Homogeneity Model for Water Exchange in the Brain: I. Theoretical Derivation, Journal of Cerebral Blood Flowand Metabolism, 18(12): 1365-1377, 1998.
Lucy E. Kershaw et al., Precision in Measurements of Perfusion and Microvascular Permeability with T1-weighted Dynamic Contrast-Enhanced MRI, Magnetic Resonance in Medicine, 56(5): 986-992, 2006.
David L. Buckley, Uncertainty in the Analysis of Tracer Kinetics Using dynamic Contrast-Enhanced T1-weighted MRI, Magnetic Resonance in Medicine, 47(3): 601-606, 2002.

* cited by examiner

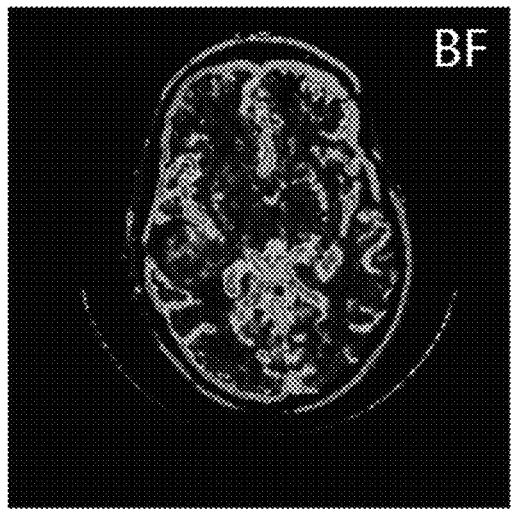
FIG. 9-A
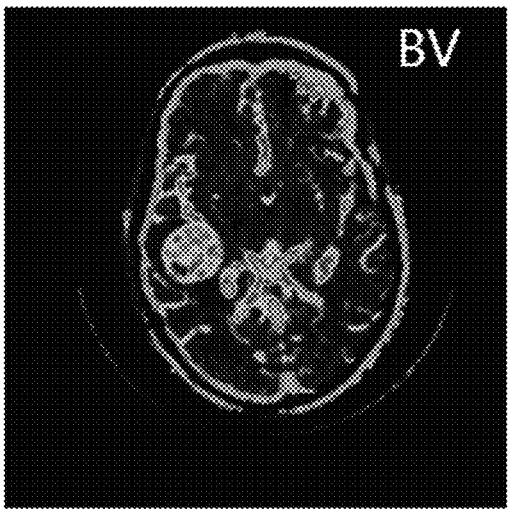
FIG. 9-B
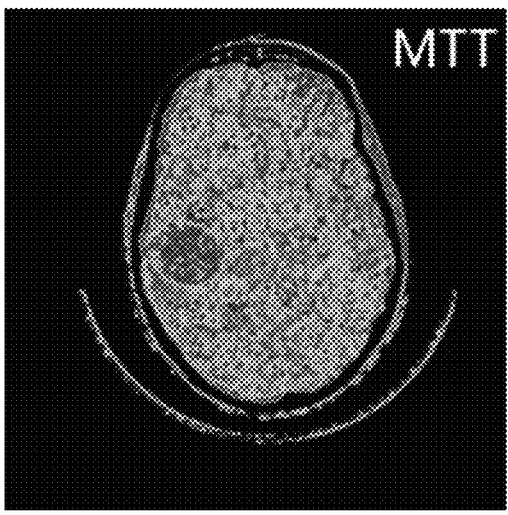
FIG. 9-C
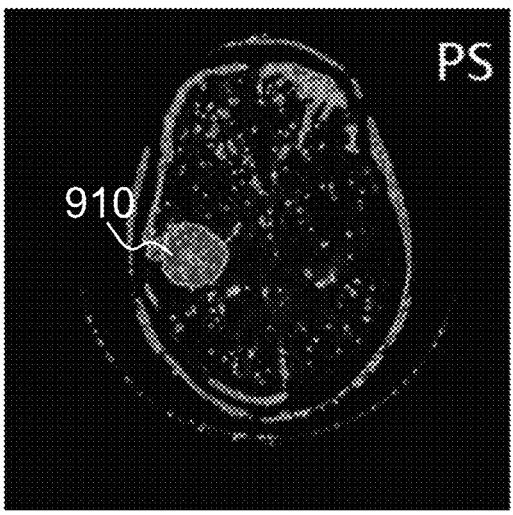
FIG. 9-D

METHOD AND DEVICE FOR PERFUSION ANALYSIS

CROSS-REFERENCE TO RELATED APPLICATIONS

This application is a continuation of International Application No. PCT/CN2017/074703 filed on Feb. 24, 2017, which claims priority of Chinese Application No. CN201610112593.X, filed on Feb. 29, 2016. Each of the above-referenced applications is expressly incorporated herein by reference to their entireties.

TECHNICAL FIELD

The present disclosure is generally related to medical imaging, more particularly, to methods and devices for perfusion analysis.

BACKGROUND

Perfusion may indicate a flow of the blood that transports oxygen or a metabolic substance to histiocytes of an organ through a capillary network. Microcirculation and a hemodynamics state of the organ may be obtained by perfusion measurement of the organ, which may reflect the function of the organ. In perfusion imaging, a perfusion parameter of the organ may be measured by a contrast agent using an imaging technology. Microcirculation and a function state of the organ may be obtained based on the perfusion parameter. The process of determining the perfusion parameter in the perfusion imaging may be referred to as perfusion analysis. The process for perfusion analysis in existing methods is not fast enough and is easily affected by noise. Therefore, it is desirable to provide methods and devices for perfusion analysis to improve the existing methods for perfusion analysis and increase the speed and accuracy for determining the perfusion parameter.

SUMMARY

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

A first aspect of the preset disclosure provides a method for perfusion analysis. The method may include: obtaining a plurality of scan images corresponding to a plurality of time points; obtaining a plurality of time-density discrete points based on the plurality of scan images; determining an initial time-density curve based on the plurality of time-density discrete points, the initial time-density curve indicating a density variation of a contrast agent in an organ or tissue over time, the organ or tissue corresponding to a pixel or voxel in the plurality of scan images; obtaining a first perfusion model; determining a first perfusion parameter based on the first perfusion model and the initial time-density curve; obtaining a second perfusion model; and determining a second perfusion parameter based on the second perfusion model and the first perfusion parameter.

In some embodiments, the initial time-density curve may comprise an initial time-density curve of input blood vessel and an initial time-density curve of tissue.

In some embodiments, the first perfusion model may comprise a singular value model or a maximum slope model.

In some embodiments, determining the first perfusion parameter based on the first perfusion model and the initial time-density curve may comprise: determining a residual function curve by performing deconvolution based on the singular value model; and determining the first perfusion parameter based on the residual function curve.

In some embodiments, determining the first perfusion parameter based on the residual function curve may comprise: dividing the residual function curve into a delay phase, a capillary phase, and an extravascular extracellular space (EES) phase in a chronological order; and determining the first perfusion parameter based on the delay phase, the capillary phase, and the EES phase.

In some embodiments, determining the first perfusion parameter based on the first perfusion model and the initial time-density curve may comprise: determining an area under the initial time-density curve of input blood vessel, an area under the initial time-density curve of tissue, a maximum slope of an ascent stage of the initial time-density curve of tissue, and a peak value of the initial time-density curve of input blood vessel based on the initial time-density curve of input blood vessel and the initial time-density curve of tissue; and determining the first perfusion parameter based on the area under the initial time-density curve of input blood vessel, the area under the initial time-density curve of tissue, the maximum slope of the ascent stage of the initial time-density curve of tissue, and a peak value of the initial time-density curve of input blood vessel.

In some embodiments, the first perfusion parameter may comprise a blood volume, a blood flow, and a mean transition time.

In some embodiments, determining the second perfusion parameter based on the second perfusion model and the first perfusion parameter may comprise an iterative operation including: determining a target function; determining an estimated perfusion parameter; determining a target function value based on the target function, the estimated perfusion parameter, and the second perfusion model; determining whether the target function value meets a terminating condition; determining the estimated perfusion parameter as the second perfusion parameter if the target function value meets the terminating condition; and performing a new iteration if the target function value does not meet the terminating condition, wherein in a first iteration, the estimated perfusion parameter is set as the first perfusion parameter.

In some embodiments, the target function may represent a quadratic sum of residuals or an average quadratic sum of residuals, wherein the quadratic sum of residuals may represent a quadratic sum of one or more density differences, the density difference may refer to a difference between a density of the contrast agent of a time-density curve of tissue relating to the second perfusion model at one of the plurality of time points and a density of the contrast agent of the initial time-density curve of tissue at the one of the plurality of time points, and the average quadratic sum of residuals may represent a ratio of the quadratic sum of residuals to a count of the plurality of time points.

In some embodiments, the time-density curve of tissue relating to the second perfusion model may be a convolution of the initial time-density curve of input blood vessel and the residual function curve, and the residual function curve may be a function relating to a perfusion parameter.

In some embodiments, the terminating condition may comprise at least one of: a condition that the average quadratic sum of residuals is less than a first threshold; or a condition that an absolute value of a difference between two estimated perfusion parameters determined in two adjacent iterations is less than a second threshold.

In some embodiments, determining the estimated perfusion parameter may comprise: determining a descent direction in a preset range of a perfusion parameter by a prediction model based on an estimated perfusion parameter determined in a last iteration, the prediction model including a Levenberg-Marquardt model; and determining the estimated perfusion parameter based on the descent direction.

In some embodiments, the second perfusion model may comprise an Adiabatic Approximation to Tissue Homogeneity (AATH) model or a Distributed Parameter (DP) model.

In some embodiments, the second perfusion parameter may comprise a blood flow, a blood volume, a mean transition time, and a permeability of a blood capillary surface.

Another aspect of the present disclosure provides a device for perfusion analysis. The device may comprise a non-transitory computer readable storage medium configured to store an executable module; and a processor configured to execute the executable module stored in the computer readable storage medium. The executable module may comprise: an image acquisition module configured to obtain a plurality of scan images corresponding to a plurality of time points; a discrete point acquisition module configured to obtain a plurality of time-density discrete points based on the plurality of scan images; a curve determination module configured to determine an initial time-density curve based on the plurality of time-density discrete points, the initial time-density curve indicating a density variation of a contrast agent in an organ or tissue over time, the organ or tissue corresponding to a pixel or voxel in the plurality of scan images; a first model acquisition module configured to obtain a first perfusion model; a first parameter determination module configured to determine a first perfusion parameter according to the first perfusion model and the initial time-density curve; a second model acquisition module configured to obtain a second perfusion model; and a second parameter determination module configured to determine a second perfusion parameter according to the second perfusion model and the first perfusion parameter.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIGS. 9-A to 9-D are exemplary perfusion parameter images of a brain tumor obtained based on a second perfusion parameter according to some embodiments of the present disclosure.

DETAILED DESCRIPTION

Figure 1:
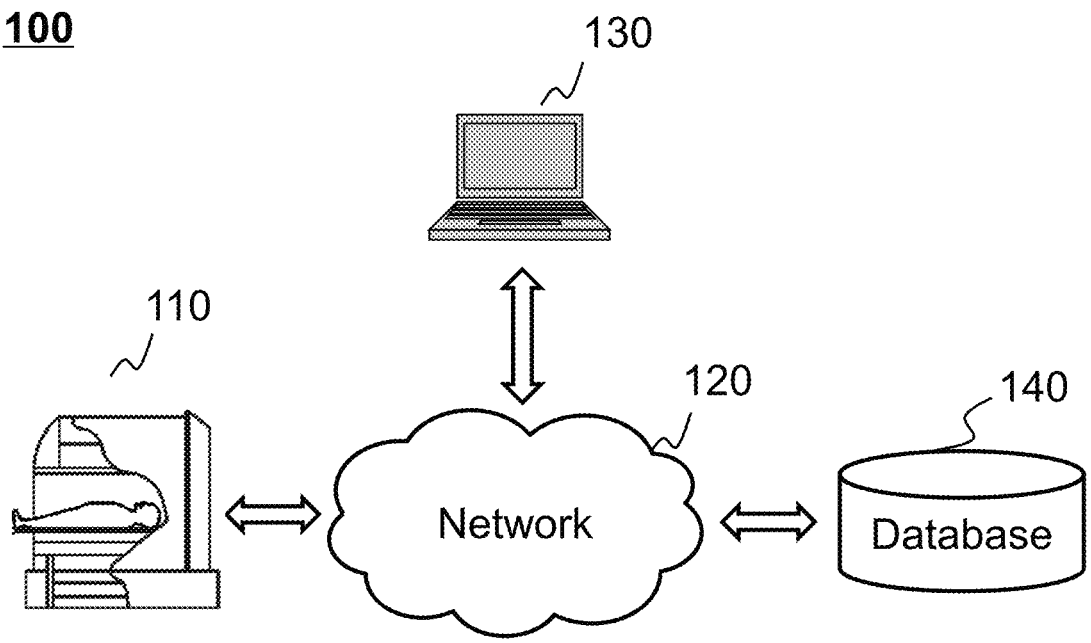
FIG. 1 is a schematic diagram illustrating an exemplary perfusion imaging system according to some embodiments of the present disclosure.

In order to illustrate the technical solutions related to the embodiments of the present disclosure, brief introduction of the drawings referred to the description of the embodiments is provided below. Obviously, drawings described below are only some examples or embodiments of the present disclosure. Those having ordinary skills in the art, without further creative efforts, may apply the present disclosure to other similar scenarios according to these drawings. It should be understood that, these exemplary embodiments are merely for those skilled in the art to preferably understand and implement the present disclosure, and not intended to limit the scope of the present disclosure. Unless stated otherwise or obvious from the context, the same reference numeral in the drawings refers to the same structure and operation.

As used in the disclosure and the appended claims, the singular forms "a," "an," and "the" include plural referents unless the content clearly dictates otherwise. It will be further understood that the terms "comprises," "comprising," "includes," and/or "including" when used in the disclosure, specify the presence of stated steps and elements, but do not preclude the presence or addition of one or more other steps and elements.

Although the present disclosure makes various references to certain modules in the system according to some embodiments of the present disclosure, any number of different modules may be used and run on a client terminal and/or a server. The modules are illustrative only, and different aspects of the systems and methods may use different modules.

Flowcharts are used in the present disclosure to illustrate operations performed by the system according to some embodiments of the present disclosure. It should be understood that the preceding or following operations may not be necessarily performed exactly in order. Instead, various steps may be processed in reverse sequence and/or simultaneously. Moreover, other operations may also be added into these procedures, or one or more steps may be removed from these procedures.

An aspect of the present disclosure relates to methods and devices for perfusion analysis. In the present disclosure, a perfusion parameter may be determined based on a relative complicated and accurate perfusion model by performing an iteration process. A relative simple perfusion model may be used to determine an estimated perfusion parameter that is used as the preliminary value of the iteration process. The methods and devices for perfusion analysis in the present disclosure may improve the accuracy and efficiency of perfusion analysis and reduce the number of iterations in the iteration process.

FIG. 1 is a schematic diagram illustrating an exemplary perfusion imaging system according to some embodiments of the present disclosure. Perfusion may represent a vital function of transporting oxygen or a metabolic substance to histiocytes of an organ using blood through a capillary network. Microcirculation and a hemodynamics state of the organ may be obtained by perfusion measurement of the organ, which may reflect the function of the organ. In perfusion imaging, a perfusion parameter of the organ may be measured by a contrast agent using an imaging technology. Microcirculation and a function state of the organ may be obtained based on the perfusion parameter. The process of determining the perfusion parameter in the perfusion imaging may be referred to as perfusion analysis. The perfusion imaging system 100 may include one or more imaging devices 110, one or more networks 120, one or more perfusion analysis devices 130, and one or more databases 140.

The imaging device 110 may scan a target object and obtain scan data. The scan data may be sent to the perfusion analysis device 130 for processing via the network 120. The scan data may be stored in the database 140 via the network 120. The target object may include a human body, an animal, etc. The imaging device 110 may include a Computed Tomography (CT) device, a Magnetic Resonance Imaging (MRI) device or a Positron Emission Computed Tomography (PET) device.

The perfusion analysis device 130 may process or analyze data (e.g., scan data or a scan image obtained by the imaging device 110 and/or stored in the database 140) and generate a processing result. For example, the perfusion analysis device 130 may generate a scan image based on the scan data. As another example, the perfusion analysis device 130 may generate a perfusion parameter and/or a perfusion parameter diagram by processing or analyzing the scan image. The scan image may be a two-dimensional (2D) image or a three-dimensional (3D) image. The perfusion analysis device 130 may include a processor and an input/output (I/O) device (not shown). In some embodiments, the processor may be a server or a server group. The server group may be centralized, such as a data center. The server group may be distributed, such as a distributed system. The processor may be a cloud server, a file server, a database server, a File Transfer Protocol (FTP) server, an application server, a proxy server, a mail server, or the like, or any combination thereof. The processor may be local or remote. A local processor may include a processor integrated in the perfusion analysis device 130. A remote processor may include a processor connected with the perfusion analysis device 130 via a network (e.g., the network 120). In some embodiments, the processor may read information stored in the database 140 (e.g., a medical image stored in the database 140), information in an imaging system (e.g., a medical image generated based on the imaging service 110). In some embodiment, the I/O device may input data to the processor. The I/O device may receive data output from the processor. The I/O device may present the output data in a form of number, character, image, video, cartoon, voice, or the like. In some embodiments, the I/O device may include an input device, an output device, or the like, or any combination thereof. The input device may include a character input device (e.g., a keyboard), an optical reading device (e.g., an optical marker reader, an optical character reader), a graphic input device (e.g., a mouse, an operation rod, a light pen), an image input device (e.g., a camera, a scanner, a fax machine), an analog input device (e.g., a language analog digital conversion recognition system), or the like, or any combination thereof. The output device may include a display device, a printing device, a plotter, an image output device, a voice output device, a magnetic recording device, or the like, or any combination thereof. In some embodiments, the perfusion analysis device 130 may include a storage device (not shown). The storage device may store various information such as programs or data. In some embodiments, data and/or a processing result generated by the perfusion analysis device 130 (e.g., a scan image, a perfusion parameter, a perfusion parameter image) may be stored in the database 140 and/or the storage device in the perfusion analysis device 130. In some embodiments, the data and/or the processing result generated by the perfusion analysis device 130 may be output through the I/O device.

The database 140 may refer to any device with a storage function in general. The database 140 may store the scan data obtained from the imaging device 110 and data generated during the operation of the perfusion analysis device 130. The database 140 may be local or remote. A local database may include a device with a storage function integrated in the database 140. A remote database may include a device with a storage function connected with the database 140 via a network (e.g., the network 120). The database 140 may include a hierarchical database, a network database, a relational database, or the like, or any combination thereof. The database 140 may digitize information, and then store the digitized information by an electrical method, a magnetic method, an optical method, or the like. The database 140 may store various information, such as a program or data. The database 140 may be a device that stores information by an electric energy method, for example, a Random Access Memory (RAM), a Read Only Memory (ROM), etc. Exemplary RAM may include a dekatron, a selectron, a delay line memory, a Williams tube, a dynamic RAM (DRAM), a static RAM (SRAM), a thyristor RAM (T-RAM), a zero-capacitor RAM (Z-RAM), or the like, or any combination thereof. Exemplary ROM may include a bubble memory, a twistor memory, a film memory, a plated wire memory, a magnetic-core memory, a drum memory, a CD-ROM, a hard disk, a tape, a NVRAM, a phase-change memory, a magneto-resistive random access memory, a ferroelectric random access memory, a nonvolatile SRAM, a flash memory, an electrically erasable programmable read-only memory (EEPROM), an erasable programmable read-only memory, a mask read only memory, a floating connected gate random access memory, a nano random access memory, a racetrack memory, a resistive random access memory, a programmable metallization unit, or the like, or any combination thereof. The database 140 may be a device that stores information by a magnetic energy method, for example, a hard disk, a soft disk, a tape, a magnetic core storage, a bubble memory, a U-Disk, a flash memory, etc. The database 140 may be a device that stores information by an optical method, for example, a CD, a DVD, etc. The database 140 may be a device that stores information by a magneto-optical method, for example, a magneto-optical disk, etc. Access modes of the database 140 may include a random access mode, a serial access mode, a read-only access mode, or the like, or any combination thereof. The database 140 may be a non-permanent memory or a permanent memory. The storage devices described above is only examples. The storage devices used in the perfusion imaging system 100 are not intended to be limiting.

The network 120 may be a single network or a combination of multiple networks. The network 120 may include a local area network, a wide area network, a public network, a dedicated network, a wireless local area network, a virtual network, a metropolitan area network, a public switched telephone network, or the like, or any combination thereof. The network 120 may include a variety of network access points, such as wired or wireless access points, a base station, or network switching points. A data source may be connected to the network 120 through the access points. Information may be sent via the network 120.

It should be noted that the above description of the perfusion imaging system is merely provided for the purpose of illustration, and not intend to limit the scope of the present disclosure. For persons having ordinary skills in the art, modules may be combined in various ways, or connected with other modules as sub-systems, and various modifications and transformations in from and detail may be conducted under the teaching of the present disclosure. However, those modifications and transformations may not depart from the spirit and scope of this disclosure. For example, the database 140 may be a cloud computing platform with a data storage function including a public cloud platform, a private cloud platform, a community cloud platform, a hybrid cloud platform, etc. All such transformation are within the protection scope of the present disclosure.

Figure 2:
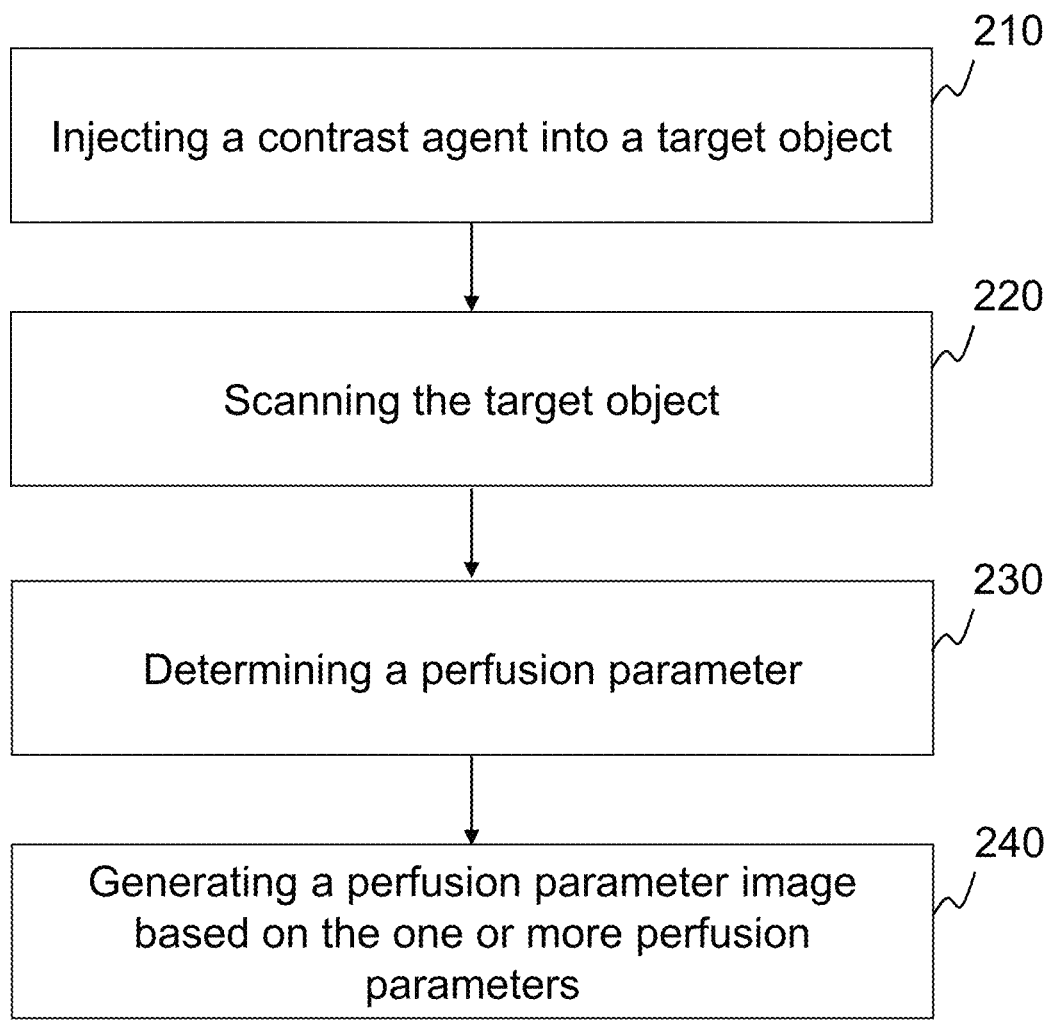
FIG. 2 is a flowchart illustrating an exemplary process for perfusion imaging according to some embodiments of the present disclosure.

FIG. 2 is a flowchart illustrating an exemplary process for perfusion imaging according to some embodiments of the present disclosure. In 210, a contrast agent may be injected into a target object. The target object may include a human body, an animal, etc. In perfusion imaging, blood circulation, microcirculation, and a function state of an organ may be obtained by tracing the flow of the contrast agent in the target object. The contrast agent may include a high density contrast agent or a low density contrast agent. The high density contrast agent may include a barium sulfate product or an iodine product. The iodine product may include inorganic iodide, organic iodide, iodinated oil or fatty acid iodide. The organic iodide may include ionized iodide, non-ionic iodide or non-ionic dimer iodide. In some embodiments, the contrast agent may be injected into a vein of the target object. In some embodiments, the target object may take the contrast agent (e.g., barium sulfate) orally to make the contrast agent enter the target object.

In 220, the target object may be scanned by the imaging device 110. In some embodiments, a region of interest (ROI) of the target object may be scanned. The ROI may be the whole or a part of the target object, such as a head, a chest, a belly, a heart, a liver, an upper limb, a lower limb, a spine, a skeleton, a blood vessel, a diseased region, a tumor, or the like, or any combination thereof. In some embodiments, a plurality of images, each of which corresponds to a time point, of a selected layer of the ROI may be obtained to indicate how a density of the contrast agent in an organ or tissue in the selected layer changes over time. A time-density curve (TDC) may be used to indicate a density variation of the contrast agent in an organ or tissue over time. The time-density curve may indicate a density variation of the contrast agent in an organ or tissue corresponding to a pixel or voxel in a scan image over time. According to the organ or tissue that a time-density curve corresponds to, the time-density curve may include a time-density curve of input blood vessel, a time-density curve of output blood vessel, and a time-density curve of tissue. The time-density curve of tissue may indicate a density variation of the contrast agent in an organ or tissue in the ROI over time. The time-density curve of input blood vessel may indicate a density variation of the contrast agent in a blood vessel that supplies blood to an organ or tissue in the ROI over time. The input blood vessel may include an artery supplying blood to an organ or tissue, for example, an anterior cerebral artery, a middle cerebral artery, etc. The time-density curve of output blood vessel may indicate a density variation of the contrast agent in an output blood vessel over time. The output bold vessel may include a vein.

In 230, a perfusion parameter may be determined by the perfusion analysis device 130. In some embodiments, the perfusion parameter may be determined by a perfusion model based on the time-density curve. The perfusion parameter may be a parameter relating to hemodynamics. The perfusion parameter may include a blood flow (BF), a blood volume (BV), a mean transition time (MTT), a permeability surface (PS) of a blood capillary (also referred to as a permeability of a blood capillary surface), or the like, or any combination thereof. The blood flow may refer to a volume of blood flowing through blood vessels in an ROI within a time period. The blood volume may refer to a volume of blood in an ROI. The mean transition time may refer to a mean time that blood flows through blood vessels in an ROI. The blood vessels in an ROI may include an artery, a blood capillary, a venous sinus, a vein, or the like. The transition times that blood flows through different blood vessels in an ROI may be different. The mean transition time may be used as one of the perfusion parameters in the present disclosure. In some embodiments, the mean transition time may indicate a time that the contrast agent passes through a blood capillary. The permeability surface of a blood capillary may refer to a unidirectional transfer rate that the contrast agent enters an intercellular space through a capillary endothelium. In general, the permeability surface of a blood capillary of a neoplastic lesion region may be larger than the permeability surface of a blood capillary of a region with no neoplastic lesion. Consequently, the permeability surface of a blood capillary may be used for research of the neoplastic lesion.

The perfusion model may include a non-deconvolution model or a deconvolution model. The non-deconvolution model may include a maximal slope model. The deconvolution model may refer to a model using a residual function to determine the perfusion parameter. The residual function may indicate how an amount of the contrast agent remaining in an organ or tissue of the target object changes over time when a unit amount (e.g., 1 ml, 1 µl, 1 mg, 1 g) of the contrast agent is injected into the target object. The deconvolution model may include a singular value decomposition deconvolution model, an adiabatic approximation to tissue homogeneity (AATH) model, or a distributed parameter (DP) model.

In 240, a perfusion parameter image may be generated by the perfusion analysis device 130 based on the perfusion parameter. In some embodiments, the perfusion parameter image may be generated based on a scan image of a certain layer of the ROI and a perfusion parameter value corresponding to at least one pixel or voxel of the scan image. In the perfusion parameter image, different perfusion parameter values may be represented as different colors. In some embodiments, a color may represent a perfusion parameter value or a range of the perfusion parameter value.

Figure 3:
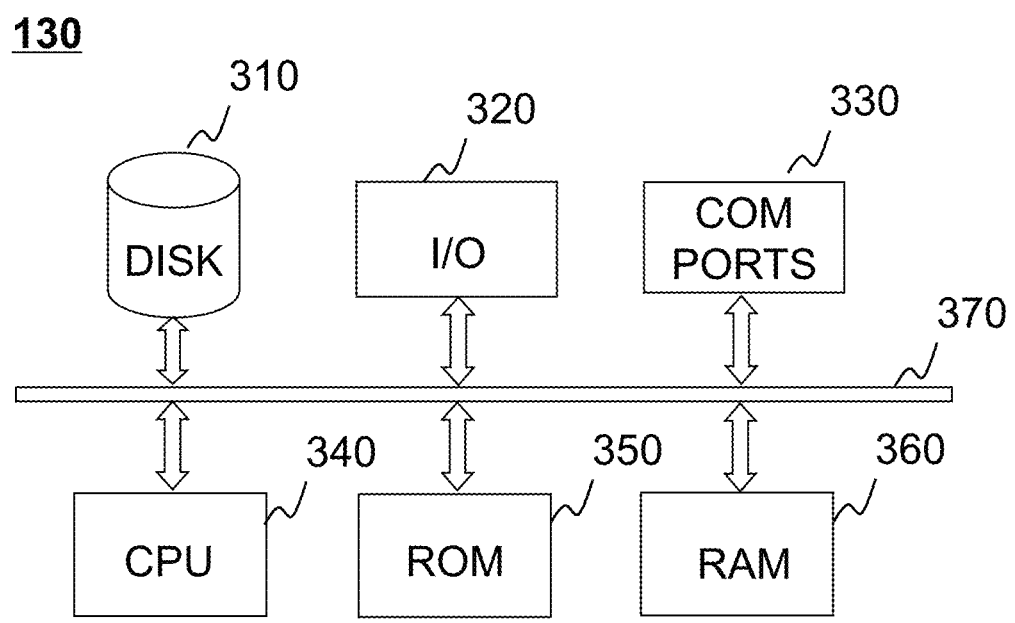
FIG. 3 is a schematic diagram illustrating exemplary hardware and/or software components of a computing device according to some embodiments of the present disclosure.

FIG. 3 is a schematic diagram illustrating exemplary hardware and/or software components of a computing device according to some embodiments of the present disclosure. The computing device may be a general-purpose computer or a specific-purpose computer. The perfusion analysis device 130 may be implemented on the computing device through its hardware, software program, firmware, or any combination thereof. Although only one such computer is shown for convenience, the computer functions related to the perfusion analysis device 130 as described herein may be implemented in a distributed manner on a number of similar platforms to distribute the processing load.

The computing device may include a communication port 330 connected with a network (e.g., the network 120 in FIG. 1) for data communicating. The computing device may further include a central processing unit (CPU) 340 used for executing a program instruction. The CPU 340 may include one or more processors. The computing device may include an internal communication bus 370, program storage and data storage of different forms including, for example, a disk 310, a read only memory (ROM) 350, or a random access memory (RAM) 360, for various data files to be processed and/or transmitted by the computing device. The computing device may also include program instructions to be executed by the CPU 340. The computing device may also include an I/O 320, supporting input/output between the computing device and other components (e.g., a user). The computing device may also receive programming and data via network communications.

Figure 4:
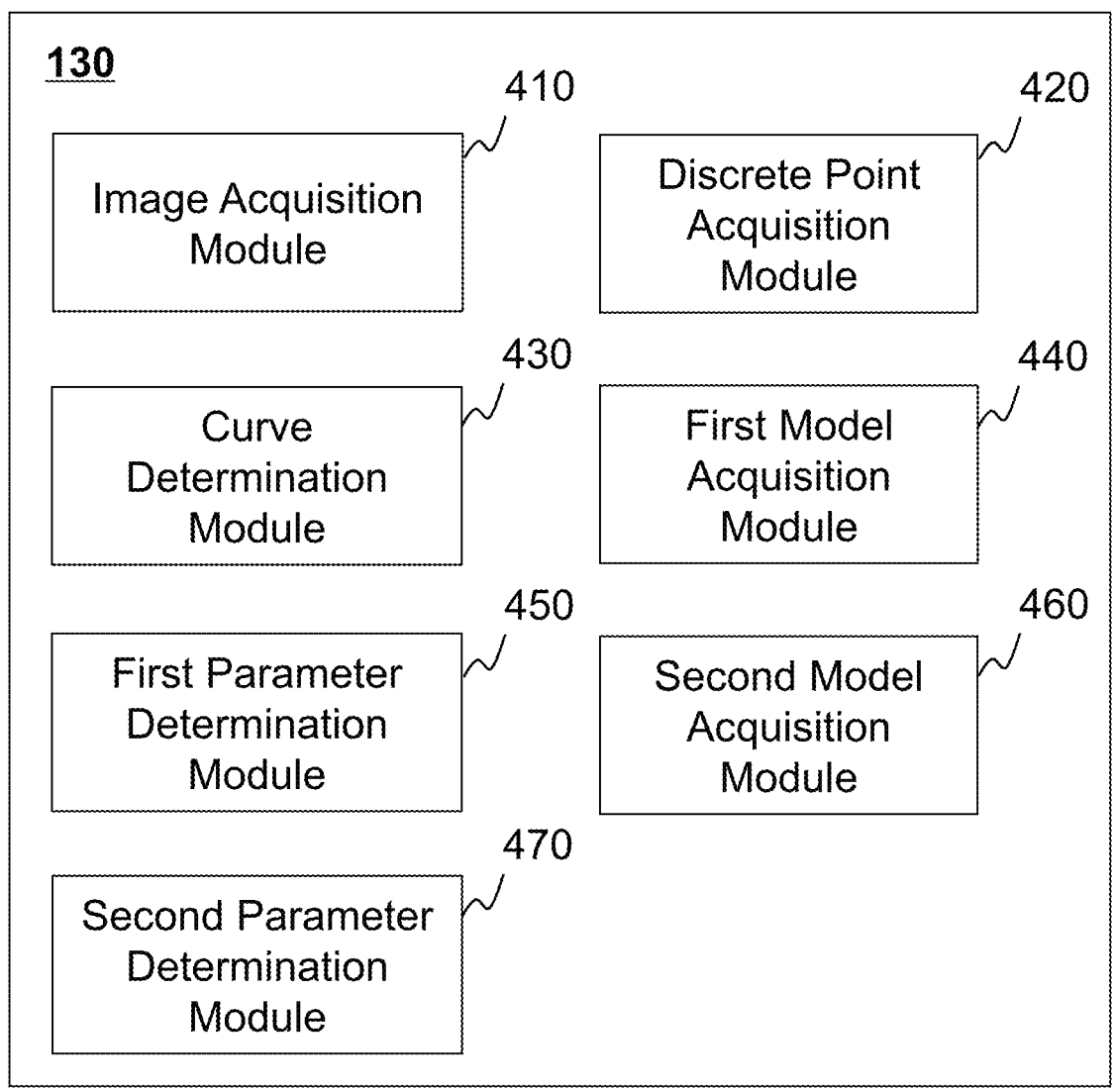
FIG. 4 is a schematic diagram illustrating an exemplary perfusion analysis device according to some embodiments of the present disclosure.

FIG. 4 is a schematic diagram illustrating an exemplary perfusion analysis device according to some embodiments of the present disclosure. The perfusion analysis device 130 may include an image acquisition module 410, a discrete point acquisition module 420, a curve determination module 430, a first model acquisition module 440, a first parameter determination module 450, a second model acquisition module 460, and a second parameter determination module 470. The image acquisition module 410, the discrete point acquisition module 420, the curve determination module 430, the first model acquisition module 440, the first parameter determination module 450, the second model acquisition module 460, and the second parameter determination module 470 may be implemented by the CPU 340 of the computing device as shown in FIG. 3.

The image acquisition module 410 may obtain a plurality of scan images. The scan image may include a CT image, an MRI image, or a PET image. The scan image may be a 2D image or a 3D image. The plurality of scan images may correspond to a selected layer of an ROI of a target object at different time points. In some embodiments, the imaging devices 110 may scan a same layer of a same ROI at different time points to obtain scan data corresponding to the different time points. The image acquisition module 410 may generate scan images corresponding to the different time points by reconstructing the scan data. In some embodiments, the acquisition module 410 may obtain scan images corresponding to different time points from a storage device (e.g., the database 140). Intervals between any two adjacent time points may be same or different. In some embodiments, the interval between two adjacent time points or the number of the time points may be default of the perfusion analysis device 130 or set by a user (e.g., a doctor, an imaging technician, etc.).

The discrete point acquisition module 420 may obtain a plurality of time-density discrete points. The discrete point acquisition module 420 may obtain the plurality of time-density discrete points based on the scan images corresponding to different time points. The time-density discrete point may refer to a density of the contrast agent in an organ or tissue corresponding to a pixel or voxel in a scan image at a time point. According to the organ or tissue that the time-density discrete point corresponds to, the time-density discrete point may include a time-density discrete point of input blood vessel, a time-density discrete point of output blood vessel, and a time-density discrete point of tissue. The time-density discrete point of tissue may refer to a density of the contrast agent in an organ or tissue in an ROI at a time point. The time-density discrete point of input blood vessel may refer to a density of the contrast agent in a blood vessel that supplies blood to an organ or tissue in an ROI at a time point. The input blood vessel may include an artery supplying blood to an organ or tissue, for example, an anterior cerebral artery, a middle cerebral artery, etc. The time-density discrete point of output blood vessel may refer to a density of the contrast agent in an output blood vessel at a time point. The output blood vessel may include a vein. In CT perfusion imaging, a density of the contrast agent may be obtained by measuring a CT value. The CT value may refer to a measuring unit for measuring a density of at least a portion of tissue or an organ. The CT value may relate to a linear absorption coefficient to X-rays of tissue. A unit of the CT value may be represented as a Hounsfield unit (HU). For example, in the CT perfusion imaging, when the contrast agent is an iodine product, 1 mg/ml of iodine may be equivalent to 25 HU, which indicates that 1 mg of iodine may make the CT value of 1 ml of tissue or organ be increased by 25 HU. Consequently, an accumulation quantity of iodine in 1 ml of the organ or tissue may be obtained by detecting the change of the CT value of the organ or tissue, and the density of the iodine product may be obtained accordingly.

The curve determination module 430 may determine an initial time-density curve based on the plurality of time-density discrete points. The initial time-density curve may be a time-density curve determined through connecting two adjacent time-density discrete points using a straight line or a curve.

The first model acquisition module 440 may obtain a first perfusion model. The first perfusion model may include a singular value decomposition (SVD) deconvolution model and/or a maximal slope model.

The first parameter determination module 450 may determine a first perfusion parameter based on the first perfusion model and the initial time-density curve. The first perfusion parameter may include a blood flow (BF), a blood volume (BV), a mean transition time (MTT), or the like, or any combination thereof.

The second model acquisition module 460 may obtain a second perfusion model. The second perfusion model may include an Adiabatic Approximation to Tissue Homogeneity (AATH) model and/or a distributed parameter (DP) model.

The second parameter determination module 470 may determine a second perfusion parameter based on the second perfusion model and the first perfusion parameter. The second perfusion parameter may include a blood flow (BF), a blood volume (BV), a mean transition time (MTT), a permeability surface (PS) of a blood capillary, or the like, or any combination thereof.

It should be noted that the above description of the perfusion analysis device 130 is merely provided for the purposed of illustration, and not intended to limit the scope of the present disclosure. For persons having ordinary skills in the art, modules may be combined in various ways, or connected with other modules as sub-systems, and various modifications and transformations in form and detail may be conducted under the teachings of the present disclosure. For example, in some embodiments, the perfusion analysis device 130 may further include a storage module. As another example, in some embodiments, the modules in the perfusion analysis device 130 may share a storage module, or each module in the perfusion analysis device 130 may have its own storage module. All such transformations are within the protection scope of the present disclosure.

Figure 5:
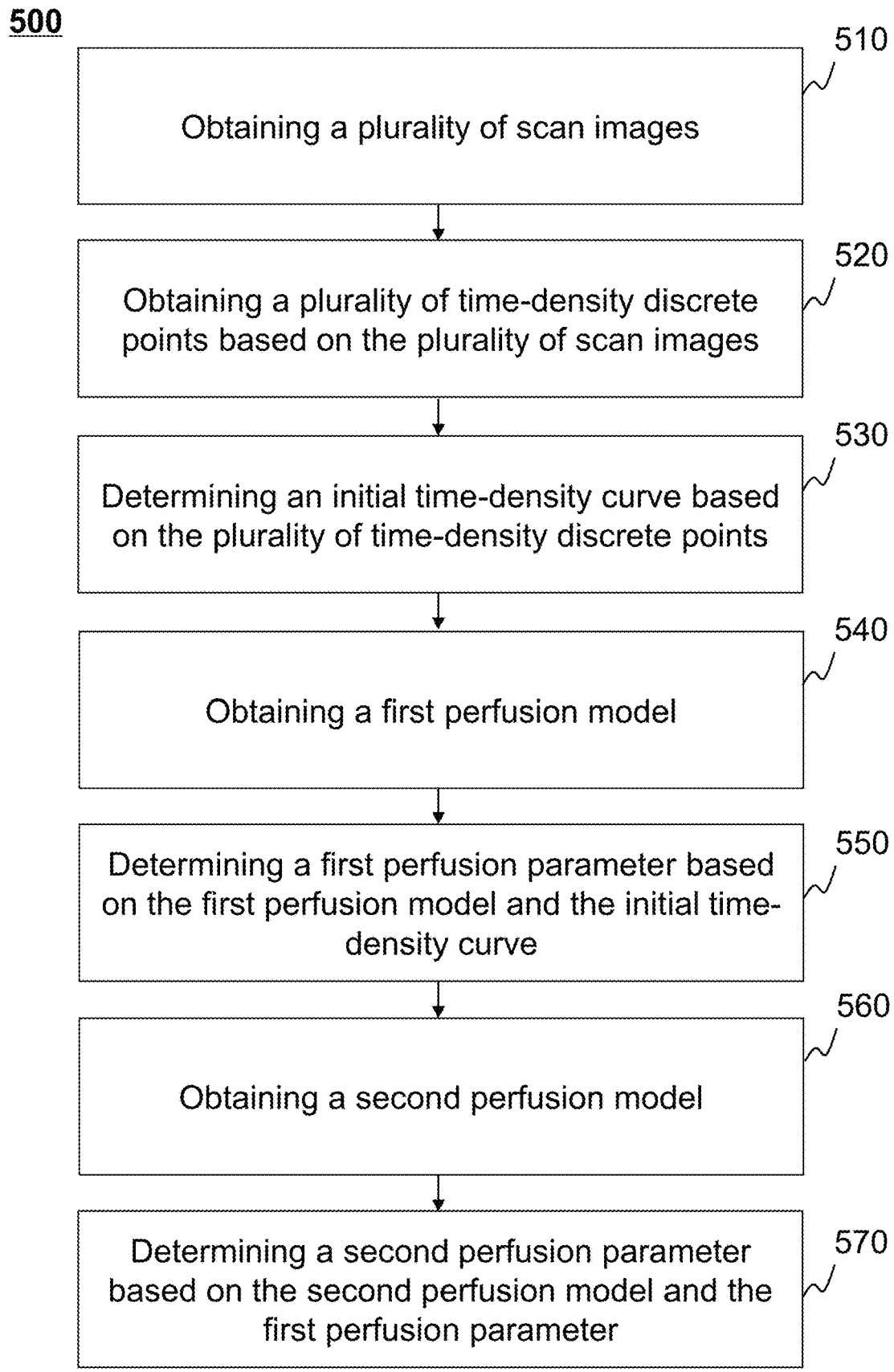
FIG. 5 is a flowchart illustrating an exemplary process for determining a second perfusion parameter according to some embodiments of the present disclosure.

FIG. 5 is a flowchart illustrating an exemplary process for determining a second perfusion parameter according to some embodiments of the present disclosure. In 510, the image acquisition module 410 may obtain a plurality of scan images. The scan image may include a CT image, an MRI image, or a PET image. The scan image may be a 2D image or a 3D image. The plurality of scan images may correspond to a selected layer of an ROI of a target object at different time points.

In 520, the discrete point acquisition module 420 may obtain a plurality of time-density discrete points based on the plurality of scan images. The time-density discrete point may refer to a density of the contrast agent of an organ or tissue corresponding to a pixel or voxel in a scan image at a time point. In some embodiments, the discrete point acquisition module 420 may obtain a time-density discrete point of input blood vessel (e.g., input artery), and a time-density discrete point of tissue.

Figure 7:
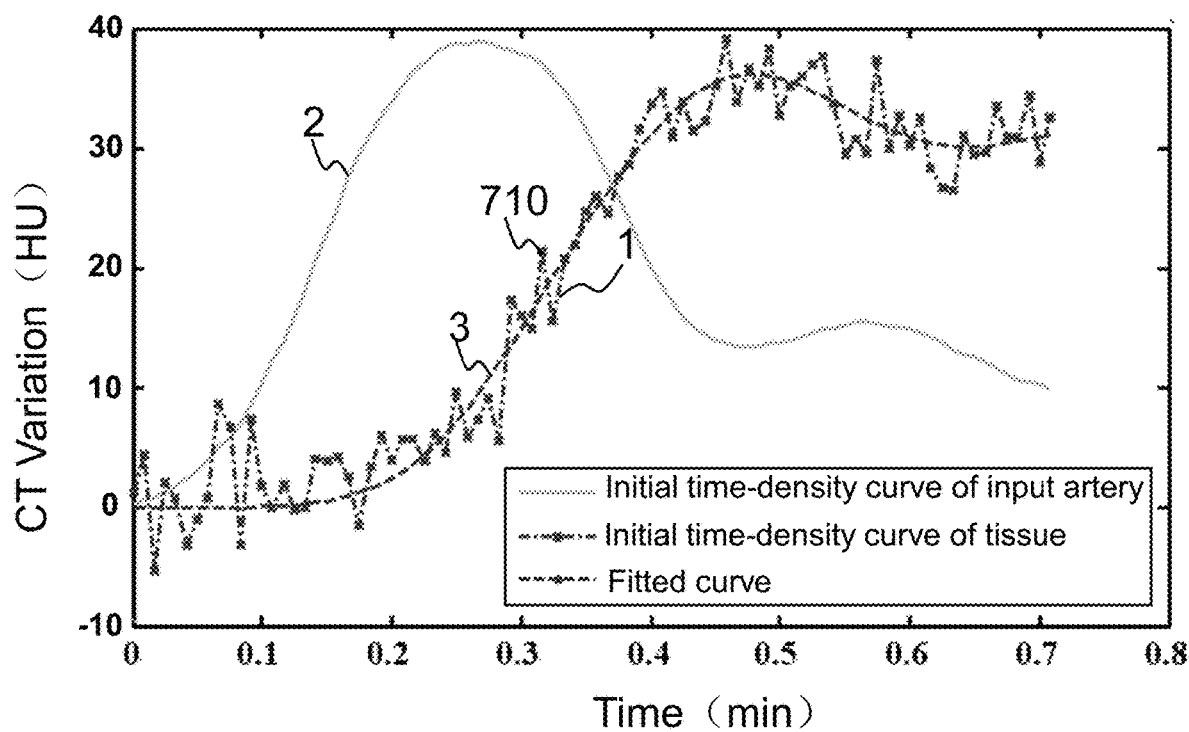
FIG. 7 is a schematic diagram illustrating an exemplary time-density curve of tissue according to some embodiments of the present disclosure.

In 530, the curve determination module 430 may determine an initial time-density curve based on the plurality of time-density discrete points. In some embodiments, the initial time-density curve may be determined by connecting two adjacent time-density discrete points using a straight line or a curve (as shown in FIG. 7). In some embodiments, an initial time-density curve determined based on a plurality of time-density discrete points of input blood vessel may be referred to as an initial time-density curve of input blood vessel. An initial time-density curve determined based on a plurality of time-density discrete points of tissue may be referred to as an initial time-density curve of tissue.

In 540, the first model acquisition module 440 may obtain a first perfusion model. The first perfusion model may include a singular value decomposition (SVD) deconvolution model and/or a maximal slope model.

In 550, the first parameter determination module 450 may determine a first perfusion parameter based on the first perfusion model and the initial time-density curve. The first perfusion parameter may include a blood flow (BF), a blood volume (BV), a mean transition time (MTT), or the like, or any combination thereof.

For example, the first parameter determination module 450 may determine the blood volume based on the SVD deconvolution model and the initial time-density curve. The first parameter determination module 450 may determine a residual function based on the SVD deconvolution model. The first parameter determination module 450 may determine the blood flow, the mean transition time, a delay time, and an uptake constant based on the residual function. The first parameter determination module 450 may determine the blood volume based on the blood flow and the mean transition time. The residual function may indicate how an amount of the contrast agent remaining in an organ or tissue of the target object changes over time when a unit amount (e.g., 1 ml, 1 μl, 1 mg, 1 g) of the contrast agent is injected into the target object. The residual function may be a function associated with the perfusion parameter. The residual function may be represent as Equation (1) below:

$$r(t)=f(BF, MTT, BV, PS, E, T_0, \ldots), \quad (1)$$

wherein r(t) may represent the residual function, BF may represent the blood flow, MTT may represent the mean transition time, BV may represent the blood volume, PS may represent the permeability surface of a blood capillary, E may represent the uptake constant, and $T_0$ may represent the delay time.

A residual function curve may be determined using the SVD deconvolution model based on the initial time-density curve of tissue and the initial time-density curve of input blood vessel. The residual function curve may be divided into a delay phase, a capillary phase, and an extravascular extracellular space (EES) phase in a chronological order based on features of the residual function curve. A duration of the delay phase may be the delay time $T_0$, a peak value of blood flow in the capillary phase may be the blood flow BF, a duration of the capillary phase may be the mean transition time MTT, a ratio of a blood flow mean value of the EES phase to the peak value of blood flow of the capillary phase may be the uptake constant E, and a product of the blood flow and the mean transition time may be the blood volume BV.

As another example, the first parameter determination module 450 may determine the blood flow, the blood volume and the mean transition time based on the initial time-density curve of tissue, the initial time-density curve of input blood vessel, and the maximal slope model. When determining the first perfusion parameter by the maximal slope model, a hypothesis may be made. The hypothesis indicates that no contrast agent leaves an organ or tissue when the contrast agent flows through the organ or tissue. With the hypothesis, a ratio of an area under the initial time-density curve of tissue to an area under the initial time-density curve of input blood vessel may be the blood volume BV, a ratio of a maximum slope of an ascent stage of the initial time-density curve of tissue to a peak value of the initial time-density curve of input blood vessel may be the blood flow BF, and a ratio of the blood volume to the blood flow may be the mean transition time MTT.

In 560, the second model acquisition module 460 may obtain a second perfusion model. The second perfusion model may include an Adiabatic Approximation to Tissue Homogeneity (AATH) model and/or a distributed parameter (DP) model.

In 570, the second parameter determination module 470 may determine a second perfusion parameter based on the second perfusion model and the first perfusion parameter. The second perfusion parameter may include a blood flow (BF), a blood volume (BV), a mean transition time (MTT), a permeability surface (PS) of a blood capillary, or the like, or any combination thereof. In some embodiments, determining the second perfusion parameter based on the second perfusion model and the first perfusion parameter may include determining a target function; determining the second perfusion parameter based on the target function and the second perfusion model by performing an iteration process including a plurality of iterations. The first perfusion parameter may be an initial value of the iteration process. The first perfusion parameter may be used in a first iteration of the iteration process.

Figure 6:
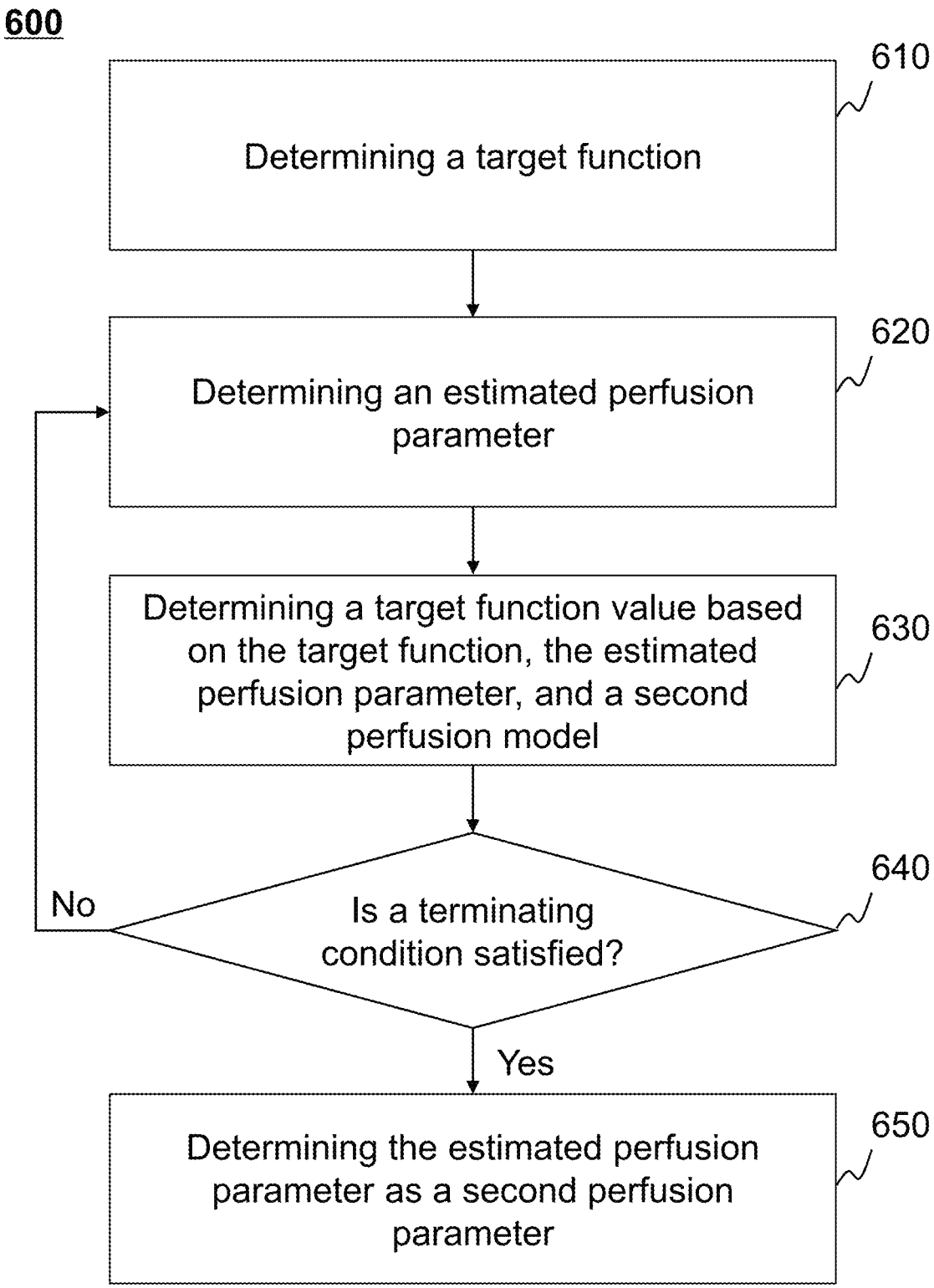
FIG. 6 is a flowchart illustrating an exemplary process for determining a second perfusion parameter according to some embodiments of the present disclosure.

FIG. 6 is a flowchart illustrating an exemplary process for determining a second perfusion parameter according to some embodiments of the present disclosure. In some embodiments, the process 600 may be used to determine the second perfusion parameter described in 570 of the process 500 based on the second perfusion model and the first perfusion parameter.

In 610, the second parameter determination module 470 may determine a target function. The target function may be used to determine an equation solution (e.g., a second perfusion parameter) satisfying a requirement of the user (e.g., a doctor or an imaging technician). In some embodiments, the target function may be determined by a least square method. The least square method may determine an equation solution based on a principle that a quadratic sum of residuals is minimum. The residual may refer to a difference between a value of a data point and a corresponding value in a simulated curve or straight line determined based on the data point. The quadratic sum of residuals may be a sum of a plurality of squared residuals. In some embodiments, the target function may include the quadratic sum of residuals or an average quadratic sum of residuals. The average quadratic sum of residuals may refer to a result of dividing the quadratic sum of residuals by the number of the time points. Merely by way of example, when the target function is the quadratic sum of residuals, the target function determined based on the least square method may be represented as Equation (2) below:

$$\varphi = \Sigma_{i=1}^{N}(\hat{C}_{tiss}(t_i,p) - C_{tiss}(t_i))^2, \qquad (2)$$

wherein $\varphi$ may represent the target function, $C_{tiss}(t_i)$ may represent the initial time-density curve of tissue, $\hat{C}_{tiss}(t_i, p)$ may represent a time-density curve of tissue relating to the second perfusion model, $t_i$ may represent a time point, N may represent the number of the time points, and p may represent a perfusion parameter corresponding to the second perfusion model.

Merely by way of example, when the second perfusion model is the AATH model, the time-density curve of tissue relating to the AATH model may be a convolution of the initial time-density curve of input blood vessel and the residual function. The time-density curve of tissue relating to the AATH model may be represented as Equation (3) below:

$$\hat{C}_{tiss}(t) = C_{art}(t) \otimes r(t), \qquad (3)$$

wherein $C_{art}(t)$ may represent the initial time-density curve of input blood vessel, $\otimes$ may represent a convolution operator, r(t) may represent the residual function and may be represented as Equation (1), and r(t) may satisfy following conditions:

$$BF > 0, 0 \leq E \leq 1, MTT > 0, T_0 \geq 0$$

In 620, the second parameter determination module 470 may determine an estimated perfusion parameter. The estimated perfusion parameter may refer to a perfusion parameter used in the residual function in each iteration. In some embodiments, the first perfusion parameter may be used in the residual function as the estimated perfusion parameter in the first iteration.

In 630, the second parameter determination module 470 may determine a target function value based on the target function, the estimated perfusion parameter, and the second perfusion model. For example, when the target function is the quadratic sum of residuals determined by the least square method and the second perfusion model is the AATH model, the process of determining the target function value may include: using the estimated perfusion parameter in the residual function; determining a time-density curve of tissue relating to the AATH model based on the residual function and the initial time-density curve of input blood vessel; determining the quadratic sum of residuals of the time-density curve of tissue relating to the AATH model and the initial time-density curve of tissue. The quadratic sum of residuals may refer to a quadratic sum of a difference value of the density of the contrast agent between the AATH model based time-density curve of tissue and the initial time-density curve of tissue at each time point.

In 640, the second parameter determination module 470 may determine whether a terminating condition is satisfied. If the terminating condition is satisfied, the process 600 may proceed to 650, and the estimated perfusion parameter used in the residual function in the current iteration may be determined as the second perfusion parameter. If the terminating condition is not satisfied, the process 600 may proceed to 620, and a new iteration may be initiated to determine a new estimated perfusion parameter. In some embodiments, the estimated perfusion parameter in the current iteration may be determined based on the estimated perfusion parameter in a last iteration. For example, the estimated perfusion parameter in the second iteration may be determined based on the first perfusion parameter used in the residual function in the first iteration. In some embodiments, a method for determining the estimated perfusion parameter may include adjusting the value of the estimated perfusion parameter in a preset range of a perfusion parameter to reduce the target function value (e.g., the quadratic sum of residuals). In some embodiments, the preset range of the perfusion parameter may include a normal numerical range of the perfusion parameter, for example, a normal numerical range of the blood flow of a brain artery may be 0.1-0.9 ml/min/ml. In some embodiments, the estimated perfusion parameter may be determined using a Levenberg-Marquardt model. In some embodiments, the terminating condition may include a condition that the average quadratic sum of residuals is less than a first threshold and/or a condition that an adjustment value between the estimated perfusion parameters in two adjacent iterations is less than a second threshold. The average quadratic sum of residuals may refer to a result of dividing the quadratic sum of residuals by the number of the time points. The adjustment value may refer to an absolute value of a difference between the estimated perfusion parameters in two adjacent iterations. The difference between the estimated perfusion parameters in two adjacent iterations may include one or more differences each of which is between a parameter (e.g., the blood flow) of the estimated perfusion parameter in an iteration and a corresponding parameter (e.g., the blood flow) of the estimated perfusion parameter in an adjacent iteration. The first threshold may be 0.01. The second threshold may be 0.001.

FIG. 7 is a schematic diagram illustrating an exemplary time-density curve of tissue according to some embodiments of the present disclosure. For CT perfusion imaging, as shown in FIG. 7, the abscissa may refer to time points that the imaging device scans a selected layer of an ROI of a target object. The ordinate may refer to a variation of a CT value of an organ or tissue in the ROI after a contrast agent is injected into the target object. Point 710 may represent a time-density discrete point of tissue. Curve 1 may represent an initial time-density curve of tissue determined based on a plurality of time-density discrete points of tissue (e.g., point 710). Curve 2 may represent an initial time-density curve of input blood vessel determined based on time-density discrete points of input blood vessel (not shown). Curve 3 may represent a time-density curve of tissue relating to a second perfusion model.

Figure 8:
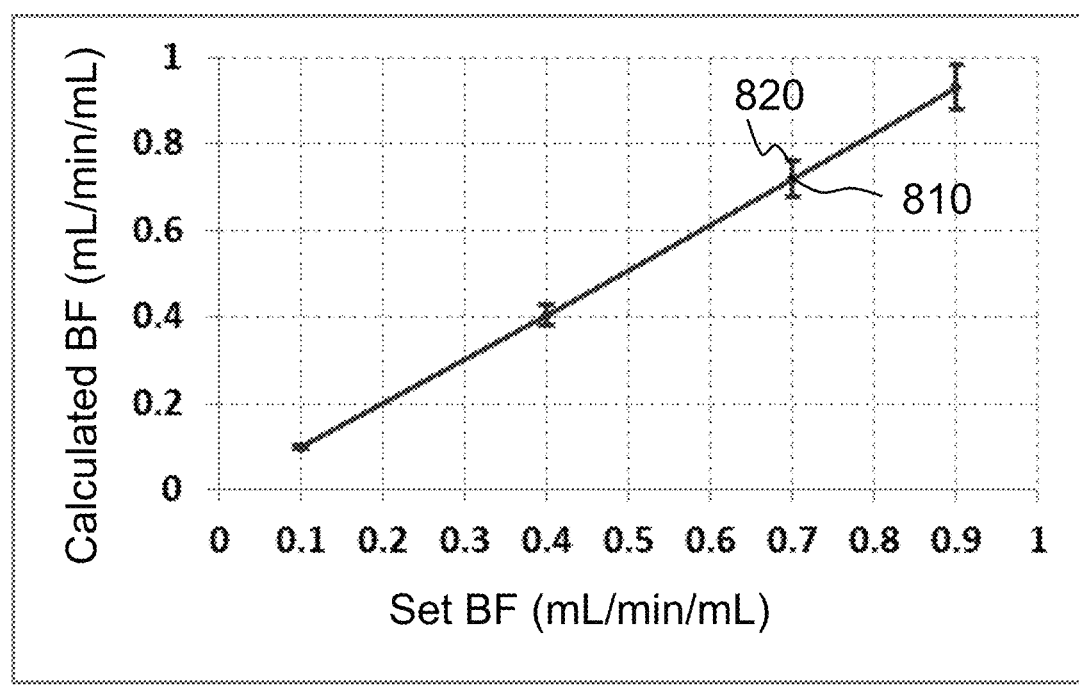
FIG. 8 is a schematic diagram illustrating an exemplary result of verifying a second perfusion parameter according to some embodiments of the present disclosure.

FIG. 8 is a schematic diagram illustrating an exemplary result of verifying a second perfusion parameter according to some embodiments of the present disclosure. Merely by way of example, when the second perfusion model is the AATH model, the method of verifying the second perfusion parameter may include: obtaining a perfusion parameter set by a user; using the perfusion parameter set by the user in a residual function; determining an ideal time-density curve of tissue by convoluting the residual function and an initial time-density curve of input blood vessel; determining a simulated time-density curve of tissue by adding random noise to the ideal time-density curve of tissue to simulate interference signals in actual data (e.g., signal-to-noise ratio is 10 dB); determining the simulated time-density curve of tissue as an initial time-density curve of tissue; determining a calculated value of a perfusion parameter based on the initial time-density curve of tissue, the initial time-density curve of input blood vessel, the first perfusion model, and the second perfusion model using the method for determining a perfusion parameter described in the process 500 and/or the process 600; comparing the calculated value of the perfusion parameter and the set value of the perfusion parameter to verify the accuracy of the method for determining a perfusion parameter described in the present disclosure.

For the blood flow, as shown in FIG. 8, the abscissa may refer to a set value of the blood flow (BF). The ordinate may refer to a calculated value of the blood flow. In the verification process, 0.1, 0.4, 0.7, and 0.9 may be used as set values of the blood flow. As shown in FIG. 8, a data point (e.g., 810) may represent a set value of the blood flow and a calculated value of the blood flow corresponding to the set value of the blood flow. In some embodiments, when determining the calculated value of the blood flow corresponding to the set value of the blood flow, the perfusion analysis device 130 may perform verification multiple times (e.g., 500 times) based on the process 500 and/or the process 600. The calculated value of the blood flow may be obtained based on results of the multiple times of verification. The calculated value of the blood flow may be an average value of the results of the multiple times of verification. As shown in FIG. 8, point 820 may represent a standard deviation of results of multiple times of verification corresponding to a calculated value of point 810. A half of the height of point 820 may represent the standard deviation value. The height of point 820 may be determined based on, for example, a coordinate system shown in FIG. 8. For example, in the coordinate system shown in FIG. 8, when the height of point 820 is 0.08, the standard deviation of the calculated value corresponding to point 810 may be 0.04. The standard deviation may refer to a square root of an arithmetic average of a quadratic sum of deviations relating to values in a group. The standard deviation may reflect a dispersion degree between any two of the values in the group. The quadratic sum of deviations may refer to a quadratic sum of differences between each of the values in the group and an average value of the values in the group. As shown in FIG. 8, the higher a consistency of the set value of the blood flow and the calculated value of the blood flow is, the higher the accuracy of the method for determining a perfusion parameter described in the present disclosure may be.

FIGS. 9-A to 9-D are exemplary perfusion parameter images of a brain tumor obtained based on a second perfusion parameter according to some embodiments of the present disclosure. FIG. 9-A is a perfusion parameter image of the blood flow, FIG. 9-B is a perfusion parameter image of the blood volume, FIG. 9-C is a perfusion parameter image of the mean transition time, and FIG. 9-D is a perfusion parameter image of the permeability surface. Generally, in a perfusion parameter image, the larger a gray value of a pixel or voxel is, the larger a perfusion parameter of the pixel or voxel may be. In general, a blood vessel in a tumor may include features such as a high capillary density, a high blood flow, a high blood volume, and a high permeability. As shown in FIG. 9-D, 910 is a brain tumor, the permeability surface of blood capillaries in the brain tumor, determined by the method for determining a perfusion parameter described in the present disclosure, may be higher than other brain parenchyma.

In some embodiments, the first threshold or the second threshold in the present disclosure may be a numerical range or a specific value. The first threshold or the second threshold may be determined based on historical data, default of the perfusion imaging system 100 or user (e.g., a doctor, an imaging technician, etc.) instructions.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer-readable media having computer readable program code embodied thereon.

A computer readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

We claim:

1. A method for perfusion analysis implemented on a computing device having one or more processors and one or more storage devices, the method comprising:
   obtaining a plurality of scan images corresponding to a plurality of time points;
   obtaining a plurality of time-density discrete points based on the plurality of scan images;
   determining an initial time-density curve based on the plurality of time-density discrete points, the initial time-density curve indicating a density variation of a contrast agent in an organ or tissue over time, the organ or tissue corresponding to a pixel or voxel in the plurality of scan images;
   obtaining a first perfusion model;
   determining a first perfusion parameter based on the first perfusion model and the initial time-density curve;
   obtaining a second perfusion model; and
   determining a second perfusion parameter by performing an iteration process using the second perfusion model, wherein the first perfusion parameter is used in a first iteration of the iteration process, and the second perfusion parameter is obtained in a last iteration of the iteration process.

2. The method for perfusion analysis of claim 1, wherein the initial time-density curve comprises an initial time-density curve of input blood vessel and an initial time-density curve of tissue.

3. The method for perfusion analysis of claim 2, wherein the first perfusion model includes a singular value decomposition model; and
   wherein determining the first perfusion parameter based on the first perfusion model and the initial time-density curve comprises:
   determining a residual function curve by performing deconvolution based on the singular value decomposition model; and
   determining the first perfusion parameter based on the residual function curve.

4. The method for perfusion analysis of claim 3, wherein determining the first perfusion parameter based on the residual function curve comprises:
   dividing the residual function curve into a delay phase, a capillary phase, and an extravascular extracellular space (EES) phase in a chronological order; and
   determining the first perfusion parameter based on the delay phase, the capillary phase, and the EES phase.

5. The method for perfusion analysis of claim 2, wherein the first perfusion model includes a maximum slope model; and
   wherein determining the first perfusion parameter based on the first perfusion model and the initial time-density curve comprises:
   determining an area under the initial time-density curve of input blood vessel, an area under the initial time-density curve of tissue, a maximum slope of an ascent stage of the initial time-density curve of tissue, and a peak value of the initial time-density curve of input blood vessel based on the initial time-density curve of input blood vessel and the initial time-density curve of tissue; and
   determining the first perfusion parameter based on the area under the initial time-density curve of input blood vessel, the area under the initial time-density curve of tissue, the maximum slope of the ascent stage of the initial time-density curve of tissue, and a peak value of the initial time-density curve of input blood vessel.

6. The method for perfusion analysis of claim 1, wherein determining the second perfusion parameter by performing the iteration process using the second perfusion model including:
   determining a target function;
   determining an estimated perfusion parameter;
   determining a target function value based on the target function, the estimated perfusion parameter, and the second perfusion model;
   determining whether the target function value meets a terminating condition;
   determining the estimated perfusion parameter as the second perfusion parameter if the target function value meets the terminating condition; and
   performing a new iteration if the target function value does not meet the terminating condition, wherein in a first iteration, the estimated perfusion parameter is set as the first perfusion parameter.

7. The method for perfusion analysis of claim 6, wherein the target function represents a quadratic sum of residuals or an average quadratic sum of residuals, wherein the quadratic sum of residuals represents a quadratic sum of one or more density differences, the density difference referring to a difference between a density of the contrast agent of a time-density curve of tissue relating to the second perfusion model at one of the plurality of time points and a density of the contrast agent of the initial time-density curve of tissue at the one of the plurality of time points, and the average quadratic sum of residuals represents a ratio of the quadratic sum of residuals to a count of the plurality of time points.

8. The method for perfusion analysis of claim 7, wherein the time-density curve of tissue relating to the second perfusion model is a convolution of the initial time-density curve of input blood vessel and the residual function curve, and the residual function curve is a function relating to a perfusion parameter.

9. The method for perfusion analysis of claim 7, wherein the terminating condition comprises at least one of:
a condition that the average quadratic sum of residuals is less than a first threshold; or
a condition that an absolute value of a difference between two estimated perfusion parameters determined in two adjacent iterations is less than a second threshold.

10. The method for perfusion analysis of claim 6, wherein determining the estimated perfusion parameter comprises:
determining a descent direction in a preset range of a perfusion parameter by a prediction model based on an estimated perfusion parameter determined in a last iteration, the prediction model including a Levenberg-Marquardt model; and
determining the estimated perfusion parameter based on the descent direction.

11. The method for perfusion analysis of claim 1, wherein the second perfusion model comprises an Adiabatic Approximation to Tissue Homogeneity (AATH) model or a Distributed Parameter (DP) model.

12. The method for perfusion analysis of claim 1, wherein the first perfusion parameter comprises a blood volume, a blood flow, and a mean transition time, and the second perfusion parameter comprises a blood flow, a blood volume, a mean transition time, and a permeability of a blood capillary surface.

13. A device for perfusion analysis, comprising:
one or more storage media including a set of instructions; and
one or more processors configured to communicate with the one or more storage media, wherein when executing the set of instructions, the one or more processors are directed to:
obtain a plurality of scan images corresponding to a plurality of time points;
obtain a plurality of time-density discrete points based on the plurality of scan images;
determine an initial time-density curve based on the plurality of time-density discrete points, the initial time-density curve indicating a density variation of a contrast agent in an organ or tissue over time, the organ or tissue corresponding to a pixel or voxel in the plurality of scan images;
obtain a first perfusion model;
determine a first perfusion parameter according to the first perfusion model and the initial time-density curve;
obtain a second perfusion model; and
determine a second perfusion parameter by performing an iteration process using the second perfusion model, wherein the first perfusion parameter is used in a first iteration of the iteration process, and the second parameter is obtained in a last iteration of the iteration process.

14. The device for perfusion analysis of claim 13, wherein to determine the second perfusion parameter by performing the iteration process using the second perfusion model, the one or more processors are directed to:
determine a target function;
determine an estimated perfusion parameter;
determine a target function value based on the target function, the estimated perfusion parameter, and the second perfusion model;
determine whether the target function value meets a terminating condition;
determine the estimated perfusion parameter as the second perfusion parameter if the target function value meets the terminating condition; and
perform a new iteration if the target function value does not meet the terminating condition, wherein in a first iteration, the estimated perfusion parameter is set as the first perfusion parameter.

15. The device for perfusion analysis of claim 14, wherein the target function represents a quadratic sum of residuals or an average quadratic sum of residuals, wherein
the quadratic sum of residuals represents a quadratic sum of one or more density differences, the density difference referring to a difference between a density of the contrast agent of a time-density curve of tissue relating to the second perfusion model at one of the plurality of time points and a density of the contrast agent of the initial time-density curve of tissue at the one of the plurality of time points, and
the average quadratic sum of residuals represents a ratio of the quadratic sum of residuals to a count of the plurality of time points.

16. The device for perfusion analysis of claim 15, wherein the time-density curve of tissue relating to the second perfusion model is a convolution of the initial time-density curve of input blood vessel and the residual function curve, and the residual function curve is a function relating to a perfusion parameter.

17. The device for perfusion analysis of claim 15, wherein the terminating condition comprises at least one of:
a condition that the average quadratic sum of residuals is less than a first threshold; or
a condition that an absolute value of a difference between two estimated perfusion parameters determined in two adjacent iterations is less than a second threshold.

18. The device for perfusion analysis of claim 14, wherein to determine the estimated perfusion parameter, the one or more processors are directed to:
determine a descent direction n a preset range of a perfusion parameter by a prediction model based on an estimated perfusion parameter determined in a last iteration, the prediction model including a Levenberg-Marquardt model; and
determine the estimated perfusion parameter based on the descent direction.

19. The method for perfusion analysis of claim 1, wherein the second perfusion parameter includes at least one parameter that is different from the first perfusion parameter.

20. The method for perfusion analysis of claim 1, wherein the second perfusion model is complicated and accurate relative to the first perfusion model.

* * * * *